(12) United States Patent
Sutherland

(10) Patent No.: US 7,052,026 B2
(45) Date of Patent: May 30, 2006

(54) BRACKET DEVICE FOR BICYCLE TRAILER FRAMES

(75) Inventor: Scott Sutherland, Hood River, OR (US)

(73) Assignee: 634182 Alberta Ltd., Calgary (CA)

( * ) Notice: Subject to any disclaimer, the term of this patent is extended or adjusted under 35 U.S.C. 154(b) by 0 days.

(21) Appl. No.: 10/659,716

(22) Filed: Sep. 11, 2003

(65) Prior Publication Data

US 2005/0098976 A1 May 12, 2005

(30) Foreign Application Priority Data

Sep. 11, 2002 (DE) ................................ 102 42 438

(51) Int. Cl.
*B62K 27/00* (2006.01)
(52) U.S. Cl. ...................... 280/204; 280/656
(58) Field of Classification Search ............... 280/204, 280/1.5, 647, 650, 656–658, 47.25, 47.38, 280/47.4, 47.41, 79.2, 292; 224/409
See application file for complete search history.

(56) References Cited

U.S. PATENT DOCUMENTS

| | | | | |
|---|---|---|---|---|
| 4,118,052 A | * | 10/1978 | Cabagnero | .................. 280/642 |
| 4,157,839 A | * | 6/1979 | Lahti et al. | .................. 280/642 |
| 4,953,880 A | * | 9/1990 | Sudakoff et al. | ......... 280/47.38 |
| 5,123,670 A | * | 6/1992 | Chen | .......................... 280/650 |
| 5,259,634 A | | 11/1993 | Berner et al. | |
| 5,344,171 A | * | 9/1994 | Garforth-Bles | .......... 280/415.1 |
| 5,388,853 A | * | 2/1995 | Lauro | .......................... 280/642 |
| 5,474,316 A | | 12/1995 | Britton | |
| 5,577,746 A | | 11/1996 | Britton | |
| 5,599,033 A | | 2/1997 | Kolbus et al. | |
| D382,516 S | * | 8/1997 | Hutchinson et al. | ....... D12/129 |
| 5,725,238 A | * | 3/1998 | Huang | ......................... 280/642 |
| 5,921,571 A | * | 7/1999 | Bell | ........................... 280/204 |
| 5,979,921 A | | 11/1999 | Derven et al. | |
| 6,056,306 A | | 5/2000 | Rust et al. | |
| 6,357,784 B1 | * | 3/2002 | Mitzman | ..................... 280/642 |
| 2002/0074764 A1 | * | 6/2002 | Allen et al. | ................. 280/204 |
| 2002/0135155 A1 | * | 9/2002 | Leon | .......................... 280/204 |

FOREIGN PATENT DOCUMENTS

CA 2084101 A1 5/1994

OTHER PUBLICATIONS

Cabriolet CTS Bicycle Trailer Owner's Manual, Chariot Carriers Inc. © 1997.
Chauffeur CTS Bicycle Trailer Owner's Manual, Chariot Carriers Inc. © 1997.
European Search Report dated Oct. 5, 2005 for EP 03 01 8985.

* cited by examiner

*Primary Examiner*—Anne Marie Boehler
(74) *Attorney, Agent, or Firm*—Wilmer Cutler Pickering Hale and Dorr LLP

(57) ABSTRACT

In order to improve the safety of a bicycle trailer with a foldable passenger compartment and a foldable seat arranged therein, a frame is being proposed at the backside of which a bracket element is provided that projects out towards the front and acts at the height of the shoulder area of the passenger compartment.

35 Claims, 1 Drawing Sheet

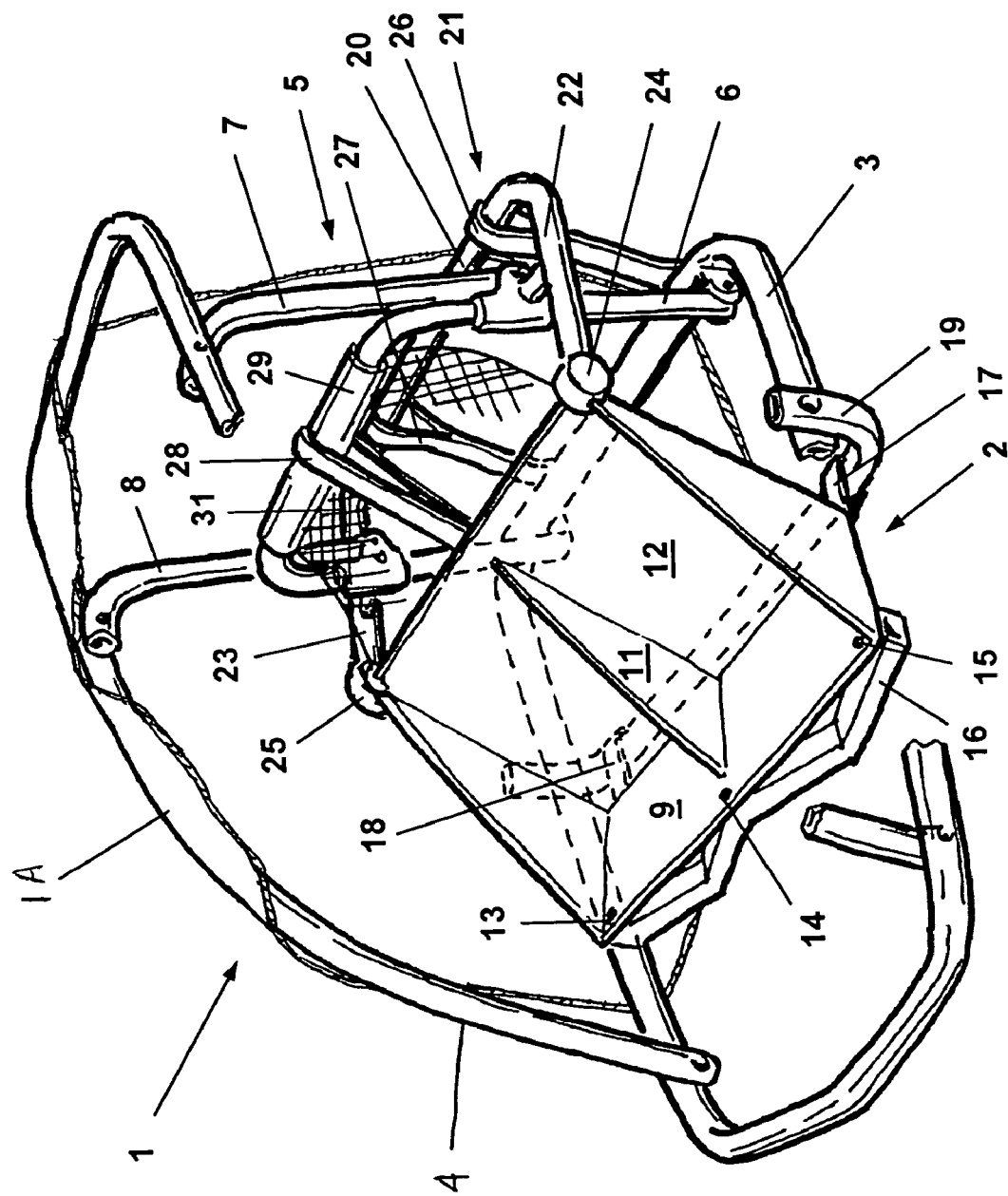

BRACKET DEVICE FOR BICYCLE TRAILER FRAMES

RELATED APPLICATION

This application claims priority from German Patent Application No. 102 42 438.1, filed Sep. 11, 2002, which is incorporated herein by reference.

BACKGROUND OF THE INVENTION

1. Technical Field

The invention relates to a frame for a bicycle trailer with a foldable passenger compartment and a foldable seat arranged therein.

2. Description of the Related Art

Bicycle trailers with a passenger compartment are gaining increased popularity as an alternative to bicycle child carriers that are mounted to the rear rack or the upper tube of the bicycle frame, because they provide far better protection for children.

The bicycle trailers must satisfy a variety of requirements. On one hand, they must have a sturdy and rigid passenger compartment so that the transported child is sufficiently protected in the event of an accident. It also must be ensured that the child cannot be readily thrown from the seat in the event of an accident. Moreover, the bicycle trailer frame should be lightweight in order to make pulling it as easy as possible. Finally, it should allow for space-saving storage.

The frame of such a bicycle trailer is generally comprised of four basic components, namely a rigid chassis forming the lower frame of a passenger compartment and bearing the axle and/or wheels and the drawbar; a foldable frame superstructure which forms the front, top and back of the passenger compartment; a seat that is braced between the apex of the foldable superstructure frame and the lower frame, and a covering made of fabric or plastic panels, which forms the outer casing of the trailer.

This covering essentially serves as weather protection and prevents children sitting in the trailer from getting their hands caught in rotating parts, such as for example the running wheels, or from touching the pavement with their feet while the trailer is in motion. There is an opening in the front through which the trailer can be boarded and which can be closed against wind, sun and rain by means of a separate cover that comes with the trailer. There is another closable opening at the back of the trailer which provides access to the storage space between the seat cloth and the rear wall of the trailer for loading and unloading purposes and which can be closed as well.

Often, the seat is formed by fabric panels stretched across the inside of the passenger compartment, which are usually separate from the external covering in order to allow for the bicycle trailer to be folded. In most cases, the seating area is fastened to the lower frame parallel thereto at its four corners either directly or with straps. The backrest, the lower edge of which is sewn firmly to the seating area, is braced in vertically at least at the two upper ends at the apex of the superstructure frame, often at a top crossbar. The shoulder straps of a restraint system, which is to prevent the child (children) from falling out of the trailer in the event of a collision or tipping of same, are attached to the backrest.

A major disadvantage of this embodiment is that the side edges of the backrest cannot be anchored to the frame because the passenger compartment could then no longer be folded. Due to the absence of such anchorage there is a risk that the restraining system, which is attached to the backrest, could, in the event of a collision or tipping, move together with the backrest and the child along with the rear wall either too far to the front or too far sideways, which would result in the loss of an essential part of the effectiveness of the restraint system. This effect is compounded by the fact that in order to achieve more shoulder width in the above described vehicles, the covering in the shoulder area is extended further sideways towards the outside with the help of an additional sub-frame, while the vertical edges of the backrest of the cloth seat remain straight. This creates a gap in the shoulder area between the edges of the backrest and the outer covering, through which, for example, objects stored in the storage compartment could slide into the passenger compartment in the event of an accident and lead to the passengers getting injured.

SUMMARY OF THE INVENTION

The underlying idea of the invention consists in providing a frame element at the backside of the frame, Which has an effect on the interior of the passenger compartment, improving its safety and/or ergonomic characteristics. What is meant here and in the following by "acting in the shoulder area" is not only that the bracket element intervenes directly in the shoulder area of the passenger compartment, but also that the bracket element produces an effect on the shoulder area of the passenger compartment from an effective position outside of the shoulder area. The term "shoulder area of the passenger compartment" in this context means the space provided for the shoulders and head of the passengers, depending on their height.

The bracket element can, in particular, be designed such that it stabilizes the backrest of the seat and/or such that it pushes out at least one side wall that is stretched over the frame, i.e. such that it creates pressure on the inside of the side wall which leads to a bulging of the side wall towards the outside.

The stabilizing effect of the pivoting bracket element can act in particular in two directions, namely on one hand in a vertical direction, with it being possible for example, provided that the bracket element is positioned accordingly, to apply vertical tensile forces to the backrest already when unfolding the passenger compartment so that the back rest is being pulled tight. Moreover, the backrest can also be stretched horizontally by means of one or more tensioning devices. This makes it possible to fasten the backrest of the seat firmly to the frame at shoulder level, so that the forces resulting from a collision or bump are being transferred from the seat to the frame much more directly.

In addition or as an alternative to the above, pushing the side walls out allows for an ergonomically more favourable design of the interior of the passenger compartment, because the shoulder area space for the passenger or passengers becomes wider.

In particular, the combination of the effects of the bracket element(s) affords the possibility to simultaneously stabilize a seat that is wider in the shoulder area and push one or both side walls out in the shoulder area. At the same time, it is possible to do away with a sub-frame that stabilizes the backrest or a sub-frame that pushes out the side walls, which would make folding the passenger compartment more difficult or even impossible.

In one embodiment, at least one part, in particular the front end, of the bracket element projects from the area formed by the frame elements for the side wall to be stretched over, so that the side wall is being pushed out. In another embodiment, the bracket element is made in the form of a disc at its front end, so that the forces acting on a side wall that is being pushed out by the front end of the bracket element are spread over a larger area, the side wall thus being subjected to less stress than if the forces act at only one point.

In another embodiment, the bracket element is pivotable in an essentially vertical plane transversely to the backside of the frame and can be locked in at least one position in order to stabilize the backrest and/or push the side wall out.

In this context and in the following, the term "locking" means not only a locking of the bracket element, but also a spring-loaded and/or damped holding of the bracket element, which can be hinged out from a resting position by a certain amount, and is moved back towards the resting position afterwards.

Having a pivotable bracket element means on one hand that it can, at least by and large, be pivoted with the backside of the frame when the bicycle trailer is being folded. On the other hand, having a pivoting and lockable bracket element that acts on the backrest of the seat makes an adjustment of the vertical tensile forces acting on the backrest possible.

The bracket element can be a type of bracket, which at least in the area of its free ends, is connected to the sides of the backrest at two upper anchoring points. The bracket can, for example, be a straight bar which stretches out between the anchoring points of the backrest across its entire width and which is hinged to the backside of the frame through the arm of a lever. The backrest can be fastened to the ends of the bar merely at the anchoring points, but it can also be fastened to the bar over part or all of its width. Moreover, the ends of the bar can extend past the side edges of the backrest in order to push out the sides.

In particular if the bracket does not extend across the entire width of the backrest it is useful to provide a strap between the anchoring points of the backrest, with which the backrest can be additionally stabilized between the anchoring points. This strap can be prevented from sagging downward in particular by vertical straps, which are sewn onto the rear wall that extends above the backrest, and which are fastened to an upper part of the frame together with the rear wall.

In a frame backside with two parallel side bars, the bracket is preferably wrapped around both side bars, with the free ends pointing forward when in their backrest bracing position. This allows the anchoring points for the backrest to be moved relatively far toward the outside without being limited by the side bars. As a result, the seating space in particular in the upper area of the backrest can be increased. In addition, the stiffness of the backside of the frame is increased, but is generally not dependent on whether the bracket is lead around the side bars or between the side bars. Furthermore, running the bracket alongside the passenger compartment affords better side impact protection for the passenger or passengers.

In particular if the backside of the frame is sloped forward against the slope of the rear wall, this creates a relatively large, usable space in the area of the floor of the bicycle trailer, which gets bigger the more the bracket projects out past the backside. Especially then, the bracket can preferably form the upper edge of a bag-like storage space, with the side walls and/or rear wall of the storage space in particular consisting of at least one fabric panel held between the bracket and the floor of the bicycle trailer and the front side of the storage space being formed, for example, by the backrest, or else the storage space being formed by a bag that is independent of the backrest.

As already mentioned above, at least one elastic element may be provided which counteracts the tensile forces acting on the bracket element when the backrest is being braced. The advantage of such an embodiment consists in the backrest being spring-loaded so that bumps can be cushioned much better than with a purely passive cushioning of bumps achieved by padding the seats. The elastic element could preferably be a strap that preferably possesses good damping characteristics. In order to be able to vary the vertical tension of the backrest, the length of such a strap is preferably adjustable.

In another embodiment of the invention, a stop is provided allowing for the bracket element to be locked. This stop is arranged such that when a folded bicycle trailer is opened up, the bracket element can only yield to the tensile forces acting via the backrest by pivoting until the stop is reached, in which case the backrest is then sufficiently stabilized by the bracket element, provided that the frame is fully opened. In order to improve passenger comfort, the stop can also be made of a material with a springy and damping effect.

If the seat is designed as a two-passenger seat, a central upper anchoring point can be provided on the backrest in order to stabilize the seat, which anchoring point is for instance being braced via a strap that is connected to the upper part of the frame. In addition, a partition can be arranged between the two seats in order to stabilize the double seat, which partition is connected to the backrest and the seating area of the double seat. Connecting the partition to the seating area in particular can prevent a downward sagging of the middle of the seating area, as a result of which two children sitting next to each other would both slide towards the middle.

BRIEF DESCRIPTION OF THE DRAWINGS

In the following, the invention is explained in greater detail with the help of a figure, wherein the FIGURE is a perspective view of a bicycle trailer frame.

DETAILED DESCRIPTION OF THE PREFERRED EMBODIMENTS

The FIGURE shows a frame of a bicycle trailer with a foldable passenger compartment 1 and a foldable seat 2 arranged therein. The frame has a chassis 3, which carries the drawbar and to which the wheels are attached in well known manner. For better clarity, wheels and drawbar are not shown. A frame roof 4, which forms the front and top of the passenger compartment, is connected via an articulated connection with the front end of the chassis. The backside of the frame 5 has a first U-shaped frame part 6, the free ends of which are hinged on the chassis 3. On both sides of the frame part 6, upward pointing side bars 7, 8 are hinged in at the upper rearward area, the upper ends of which are connected to the frame section of the frame roof 4 via an articulated connection. The side bars 7, 8 can be locked in the upright position. With this arrangement it is possible to fold the U-shaped frame part 6 and the side bars 7, 8 as well as the frame roof 4 down over the chassis without having to loosen any of the hinged joints. A frame covering 1A is stretched over the frame components to form the outer casing, such as the side walls and rear portion, of the compartment. The frame covering is shown cut away in order to make the drawing less confusing. The frame covering can be attached to the frame parts in the usual way.

The seat 2 is designed as a two-passenger seat with a seating area 9, a vertical partition 11 that divides the seating area 9 into two halves, as well as a backrest 12.

The front edge of the seating area 9 is connected to a front crossbar 16 of the chassis 3 at anchoring points 13, 14, 15 that are provided at the sides and in the middle of the front edge. At the back of the seating area 9, looped straps 17, 18 are provided with which the seating area is fastened to the rear crossbar 19. Both crossbars 16, 19 have, in addition to the anchoring function, also a chassis 3 stiffening function, with it being possible to also use the ends of the rear crossbar 19, which in this example of an embodiment are bent upward and project past the chassis frame, to attach the wheels.

Between chassis 3 and frame roof 4 at the height of the hinged connection between the U-shaped frame part 6 with the side bars 7, 8 a bracket 21 is arranged on the frame part 6 through a hinged connection, the swivelling axis of which is running parallel to the swivelling axis of the side bars 7, 8. The bracket is designed as a U, which in the shown position is open to the front, extends outwardly of and frames the backside of the frame 5 with its free lateral sides 22, 23. The bracket 21 is wide enough so that its free lateral sides 22, 23 run along the outside of the side bars 7, 8 and extend out beyond the plane defined between chassis 3 and upper frame 4 so that the passenger compartment 1 is enlarged and, so that a side wall of the frame covering 1A is being pushed out by the bracket 21. It is to be noted that in a passenger compartment without a bracket, such as bracket 21, the frame covering would extend straight between the chassis and the upper frame without being pushed out.

At the end of the free lateral sides, connection joints 24, 25 are provided that are connected to anchoring points at the upper corners of the backrest 12. The type of connection between the bracket 21 and the backrest 12 can take a variety of forms. It is for example possible to provide looped straps at the upper corners of the backrest 12, which work together with the connection joints 24, 25. Alternately, the backrest 12 could be provided with reinforced eyelets that work together with pins at the connection joints 24, 25. Another possible connection consists in clamshell-type connection joints 24, 25 with grooves running along the inside that work together with piped seams of the backrest 12.

The forward ends of free lateral sides 22, 23 can be formed as discs for example at connection joints 24, 25 to distribute the forces of bracket against the covering 1A, since the covering is stretched out by the bracket.

The backrest 12 is vertically stretched by the bracket 21 via elastic straps 26, 27. The straps 26, 27 are anchored to the chassis 3 on the one side and connected to a bridge 20 of the bracket 21 connecting the free lateral sides 22, 23 on either side, and pulled tight. Straps 26, 27 act against the weight of the seat which would tend to pull sides 22, 23 down toward the chassis. They do not only have the effect of stabilizing the backrest 12, but also a springy and damping effect so that bumps and vibrations during the ride can be cushioned. Instead of an elastic securing of the bracket 21, a locking device can be provided with which the bracket can be firmly locked in its position, for example by means of a simple bolt connection.

The top edge of the backrest 12 is braced in its middle by an additional elastic strap 28, which is connected to and works with the upper crossbar 29 of the U-shaped frame part 6 of the backside of the frame 5, with the crossbar 29 being arranged above the backrest 12 and positioned essentially in the plane of the backrest 12. In addition, the top edge of the backrest is sewn together with a mesh-type fabric panel 31, the opposite side of which is attached to the crossbar 29.

Due to the bracket 21 being arranged horizontally, a rear portion of the frame covering, which runs from the upper joints of the side bars 7, 8 via the bridge 20 of the bracket 21 to the rear edge of the frame 3, is stretched out further in the area of the backside of the frame. If the covering is open above the bridge 20 of the bracket 21 in order to give access to the storage space formed behind the seat, the elastic straps 26, 27 could be replaced provided that the bridge 20 is firmly held in position with the covering running towards the lower frame 3.

Many further modifications to the apparatus described and illustrated will readily occur to those skilled in the art to which the invention pertains. The specific embodiments described and illustrated herein should be considered only as illustrated and not be considered limiting of the scope of the claims.

The invention claimed is:

1. A frame for a bicycle trailer with a foldable passenger compartment and a foldable seat arranged therein, comprising: a front end, a backside, an upwardly acting frame member adjacent the backside of the frame, the upwardly acting frame member including an upper part, a lower part and a swivelling axis about which the upper part can be folded relative to the lower part to collapse the frame; and, at least one bracket element located at the backside of the frame projecting out towards the frame's front end and acting at the height of the shoulder area of the passenger compartment and the bracket element being pivotally connected to the upwardly acting frame member to pivot about an axis parallel with the swivelling axis of the upwardly acting frame member.

2. The frame according to claim 1, wherein the bracket element stabilizes a backrest of the seat.

3. The frame according to claim 2, wherein the bracket element pushes out at least one side wall that is stretched over the frame.

4. The frame according to claim 1, wherein the bracket element pushes out at least one side wall that is stretched over the frame.

5. The frame according to claim 4, wherein the bracket element is formed as a U-shaped member including a pair of free ends and at least a selected portion of one of the free ends of the bracket element protrudes laterally outwardly from the bracket element to cause the side wall to be stretched out further at that selected portion.

6. The frame according to claim 1, wherein the bracket element at a front end thereof is shaped as a disc.

7. The frame according to claim 1, wherein the bracket element axis of pivotal movement extends substantially horizontally and the bracket element is locked in at least one position against pivotal movement in order to stabilize a backrest of the seat and/or push out at least one side wall that is stretched over the frame.

8. The frame according to claim 1, wherein the bracket element includes a pair of free ends projecting forwardly towards a front end of the frame and a backrest of the seat is connected at two upper anchoring points to the bracket element at least in the area of its free ends.

9. The frame according to claim 8, further comprising a strap attached between the upper anchoring points.

10. The frame according to claim 1, wherein the bracket element is a U-shaped member including a pair of free ends and the bracket element is wrapped around the upwardly acting frame member, with the free ends pointing towards the front end in a position in which they brace a backrest of the seat and/or push out at least one side wall that is stretched over the frame.

11. The frame according to claim 1, wherein the bracket element forms a top edge of a storage space.

12. The frame according to claim 11, wherein the storage space is defined by side walls and a rear wall and at least one of the side walls and/or the rear wall includes at least one fabric panel held between the bracket and a floor of the bicycle trailer.

13. The frame according to claim 11, wherein the bracket element stabilizes a backrest of the seat and a front side of the storage space is formed by the backrest.

14. The frame according to claim 2, further comprising at least one elastic element that counteracts any weight of the seat on the bracket element when the backrest is being stabilized.

15. The frame according to claim 14, wherein the elastic element is an elastic strap.

16. The frame according to claim 15, wherein the length of the strap is adjustable.

17. The frame according to claim 1, wherein the bracket element is lockable in a selected pivotal position.

18. The frame according to claim 2, wherein the seat is constructed as a two-passenger seat, with a central upper anchoring point being provided for bracing a backrest of the seat.

19. The frame according to claim 18, wherein the central upper anchoring point provides bracing via a strap that is connected to an upper part of the frame.

20. The frame, according to claim 18, further comprising a partition to form two seating areas on the two-passenger, the partition being connected to the backrest and to a lower support area of the two-passenger seat.

21. A bicycle trailer comprising: a foldable passenger compartment having a foldable seat arranged therein, the foldable seat including a backrest with an upper edge, and a frame including at least one bracket element located at a backside of the frame projecting out towards the front, said at least one bracket acting at a horizontal position between a roof and a floor defining the passenger compartment, the at least one bracket element being U-shaped including a base member with a pair of opposite ends and a side arm extending outwardly from each end of the base member, each side arm including a first end connected to the base member and a free end opposite the first end and the at least one bracket element being connected adjacent its free ends to the upper edge of the backrest at two side anchoring points.

22. The bicycle trailer according to claim 21 wherein the free ends are each shaped as a disc.

23. The bicycle trailer according to claim 21, further comprising a strap secured to the seat between the side anchoring points and extending to engage a structural member of the frame.

24. The bicycle trailer according to claim 21, wherein the frame includes a front, a rear and sides between the front and the rear, the rear of the frame including two parallel side bars and the bracket element extending at the sides of the frame outwardly beyond both side bars, with the free ends pointing towards the front of the frame.

25. The bicycle trailer according to claim 21, wherein the frame includes a front and a rear, the rear of the frame including two parallel side bars and the side arms are positioned outwardly of the two parallel side bars with the free ends pointing towards the front of the frame and engaging the upper edge of the seat backrest.

26. The bicycle trailer according to claim 21, further comprising a storage space defined between the seat and the bracket element.

27. The bicycle trailer according to claim 26, further comprising a floor of the bicycle trailer and the storage space is defined by side walls and a rear wall including at least one fabric panel secured between the bracket element and the floor.

28. The bicycle trailer according to claim 26, wherein a front side of the storage space is formed by the backrest.

29. A frame for a bicycle trailer with a foldable passenger compartment and a foldable seat arranged therein, comprising: at least one bracket element located at a backside of the frame projecting out towards a front end of the frame to stabilize a backrest of the seat and acting at a height of a shoulder area of the passenger compartment and at least one elastic element that counteracts the weight of the seat on the bracket element when the backrest is being stabilized.

30. The frame according to claim 29, wherein the elastic element is an elastic strap.

31. The frame according to claim 30, wherein the length of the strap is adjustable.

32. A bicycle trailer comprising a foldable passenger compartment having a foldable seat arranged therein, the foldable seat including a backrest with an upper edge, and a frame including a front, a rear, sides between the front and the rear, the rear of the frame including two parallel side bars and at least one bracket element located at a backside of the frame projecting out towards the front, said at least one bracket element acting at a horizontal position between a roof and a floor defining the passenger compartment and securing the upper edge of the foldable seat backrest, the at least one bracket element being U-shaped including a base member with a pair of opposite ends and a side arm extending outwardly from each end of the base member, each side arm including a first end connected to the base member and a free end opposite the first end and the at least one bracket element extending at the sides of the frame outwardly beyond both side bars with the free ends pointing towards the front of the frame.

33. A bicycle trailer comprising a foldable passenger compartment having a foldable seat arranged therein, the foldable seat including a backrest with an upper edge, and a frame including at least one bracket element located at a backside of the frame projecting out towards the front, said at least one bracket element acting at a horizontal position between a roof and a floor defining the passenger compartment and securing the upper edge of the foldable seat backrest, and a storage space defined between the foldable seat and the bracket element.

34. The bicycle trailer according to claim 33, further comprising a floor of the bicycle trailer and the storage space is defined by side walls and a rear wall including at least one fabric panel secured between the bracket element and the floor.

35. The bicycle trailer according to claim 33, wherein a front side of the storage space is formed by the backrest.

* * * * *